US008724508B2

(12) United States Patent
Chiang et al.

(10) Patent No.: US 8,724,508 B2
(45) Date of Patent: *May 13, 2014

(54) AUTOMATED POLICY GENERATION FOR MOBILE COMMUNICATION NETWORKS

(75) Inventors: Cho-Yu Jason Chiang, Clinton, NJ (US); Gary Levin, Bedminster, NJ (US); Yitzchak Gottlieb, Edison, NJ (US); Ritu Chadha, Hillsborough, NJ (US); Shih-wei Li, Germantown, MD (US)

(73) Assignee: TTI Inventions C LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/219,222

(22) Filed: Aug. 26, 2011

(65) Prior Publication Data

US 2012/0250575 A1 Oct. 4, 2012

Related U.S. Application Data

(63) Continuation of application No. 11/825,365, filed on Jul. 6, 2007, now Pat. No. 8,023,423.

(60) Provisional application No. 60/819,689, filed on Jul. 10, 2006.

(51) Int. Cl.
*H04W 16/00* (2009.01)

(52) U.S. Cl.
USPC ............... 370/254; 370/230.1; 370/395.21; 370/412

(58) Field of Classification Search
USPC ......... 370/252–254, 230–230.1, 351, 395.21, 370/255, 237; 709/223–225; 710/36
See application file for complete search history.

(56) References Cited

U.S. PATENT DOCUMENTS

| | | | |
|---|---|---|---|
| 5,751,915 A | 5/1998 | Werbos | |
| 6,169,981 B1 | 1/2001 | Werbos | |
| 6,704,301 B2 * | 3/2004 | Chari et al. | 370/351 |
| 6,882,992 B1 | 4/2005 | Werbos | |
| 6,909,700 B1 * | 6/2005 | Benmohamed et al. | 370/255 |
| 6,954,435 B2 * | 10/2005 | Billhartz et al. | 370/252 |
| 7,477,599 B2 * | 1/2009 | Lee et al. | 370/230.1 |
| 7,606,895 B1 | 10/2009 | Dini et al. | |
| 7,650,522 B2 | 1/2010 | Linsley-Hood et al. | |
| 7,729,253 B1 * | 6/2010 | Khambatkone et al. | 370/235 |
| 7,826,358 B2 * | 11/2010 | Caram | 370/230 |

(Continued)

OTHER PUBLICATIONS

Liu et al, A biologically inspired QOS routing Algorithm for mobile Ad Hoc networks, Mar. 2005.*

(Continued)

*Primary Examiner* — Michael Thier
*Assistant Examiner* — Vincelas Louis
(74) *Attorney, Agent, or Firm* — Fitch, Even, Tabin & Flannery LLP

(57) ABSTRACT

A solution to the problem of automated policy generation for mobile ad hoc networks includes an optimization-based, utility-driven approach aimed at generating optimal policies with respect to the given network objectives. The combination of optimization heuristics and network simulation is used to solve the problem. Specifically, the problem of automated generation of network management policies based on available network plans and related information is solved by converting the policy generation into the following optimization problem: given network information and objectives as input, generate optimal policies as output. The optimization process is guided by a utility function based on performance evaluation criteria reflecting the network objectives.

42 Claims, 4 Drawing Sheets

```
// Define U(s, EP) as the utility value for
// a given EP
U(s, EP) = utility function of ns-2 run of s with EP;

// Use Simulated Annealing with a suitable
// temperature parameter T to control the
// annealing schedule
Choose initial values for T, currentEP;
currentBestU = U(s, currentEP);
bestEP = currentEP;
bestU = currentBestU;

While not satisfied
  Choose new ep_i near currentEP, i=1..PE;
  Post simulation tasks to Bulletin Board
    for M, s, ep_i i=1..PE;
  Wait for results u_i from the tasks;
  u = max(u_i);
  If u > bestU
    bestU = u;
    bestEp = ep_i where u=u_i;
  If u >= bestU or random() < e^(u-bestU)/T
    currentEP = ep_i;
    currentU = u_i;
  Reduce T;
  Set satisfied based on T or lack of improvement in bestU;

Return bestU, bestEP;
```

(56) References Cited

U.S. PATENT DOCUMENTS

| | | | |
|---|---|---|---|
| 8,023,423 B2 | 9/2011 | Chiang et al. | |
| 2004/0095887 A1* | 5/2004 | Klincewicz et al. | 370/237 |
| 2004/0136379 A1 | 7/2004 | Liao et al. | |
| 2005/0050246 A1* | 3/2005 | Lakkakorpi et al. | 710/36 |
| 2007/0112696 A1 | 5/2007 | Vane et al. | |

OTHER PUBLICATIONS

Ingber, "Very Fast Simulated Re-annealing," J. Math Computational Modelling; vol. 12, Issue 8, pp. 967-973; 1989.

Ram et al., "Parallel Simulated Annealing Algorithms," Journal of Parallel and Distributed Computing; vol. 37, pp. 207-212; 1996.

Li et al., "Capacity of Ad Hoc Wireless Networks," In the Proceedings of the 7th ACM International Conference on Mobile Computing and Networking;Rome (MobiCom 2001), Italy; Jul. 2001; 9 pages.

Park et al., "Energy Efficient Task Assignment Framework of Wireless Sensor Networks," In CENS Tech Report, Sep. 2003; 10 pages.

Chadha et al., "Policy-Based Mobile Ad Hoc Network Management," In the Proceedings of the 5th IEEE International Workshop on Policies for Distributed Systems and Networks; Jun. 2004; 10 pages.

Chadha et al., "Scalable Policy Management for Ad Hoc Networks," In the Proceedings of the 24th IEEE Military Communications Conference, (MILCOM 2005) Atlantic City, NJ; Oct. 17-20, 2005; 11 pages.

Chiang et al., "Towards Automation of Management and Planning for Future Military Tactical Networks," In the Proceedings of the 2006 IEEE Conference on Military Communications (MILCOM 2006); 7 pages.

Chiang et al., "Performance Analysis of Drama: A Distributed Policy-Based System for MANET Management," In the Proceedings of the 2006 IEEE Conference on Military Communications (MILCOM 2006) Washington, DC; Oct. 23-25, 2006; 8 pages.

Chiang et al., "On Automated Policy Generation System for Mobile Ad Hoc Networks," In the Proceedings of the 8th IEEE International Workshop on Policies for Distributed Systems and Networks; Jun. 2007; 5 pages.

Chiang et al., "An Automated Policy Generation System for Mobile Ad Hock Networks," In the Proceedings of the 2007 IEEE Conference on Military Communications (MILCOM 2007); Oct. 2007; 8 pages.

\* cited by examiner

FIG. 2

```
// Define U(s, EP) as the utility value for
// a given EP
U(s, EP) = utility function of ns-2 run of s with EP;

// Use Simulated Annealing with a suitable
// temperature parameter T to control the
// annealing schedule
Choose initial values for T, currentEP;
currentBestU = U(s, currentEP);
bestEP = currentEP;
bestU = currentBestU;

While not satisfied
  Choose new $ep_i$ near currentEP, i=1..PE;
  Post simulation tasks to Bulletin Board
     for M, s, $ep_i$ i=1..PE;
  Wait for results $u_i$ from the tasks;
  u = max($u_i$);
  If u > bestU
    bestU = u;
    bestEp = $ep_j$ where u=$u_j$;
  If u >= bestU or random() < $e^{(u-bestU)/T}$
    currentEP = $ep_i$;
    currentU = $u_i$;
  Reduce T;
  Set satisfied based on T or lack of improvement in bestU;

Return bestU, bestEP;
```

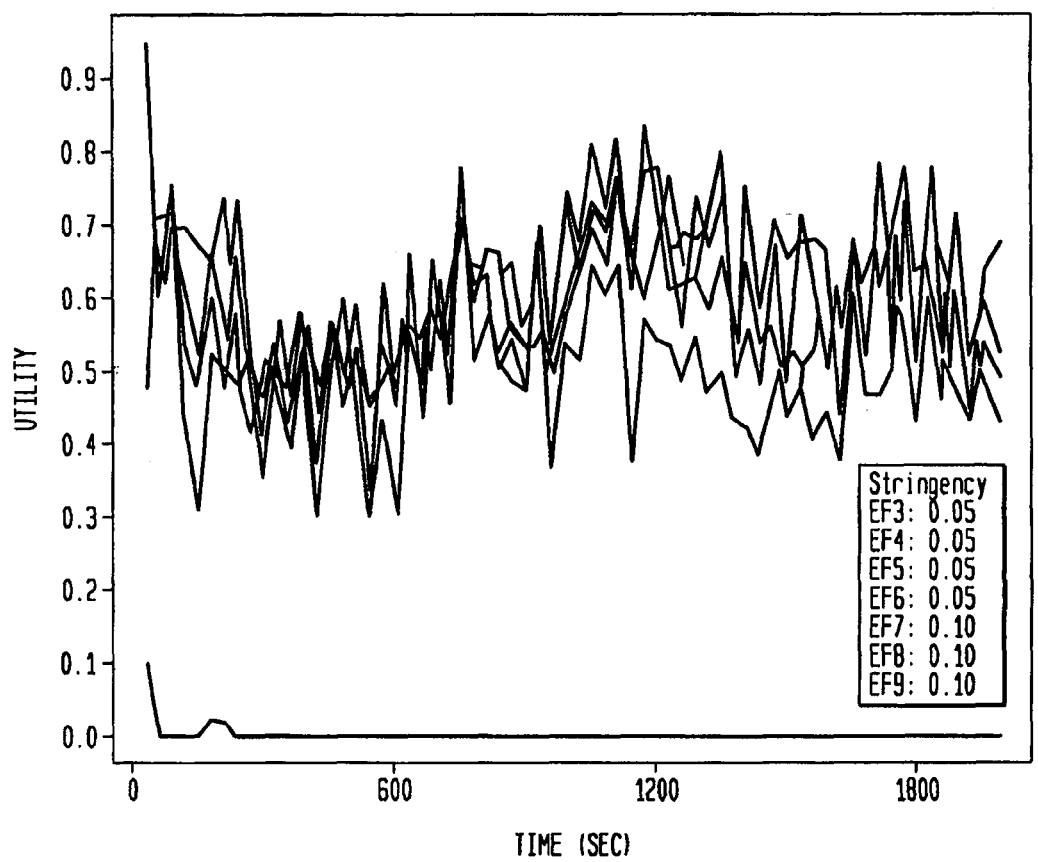

UTILITY

AUTOMATED POLICY GENERATION FOR MOBILE COMMUNICATION NETWORKS

CROSS-REFERENCE TO RELATED APPLICATIONS

This application is a continuation of U.S. patent application Ser. No. 11/825,365, filed Jul. 6, 2007, which claims the benefit of U.S. Provisional Patent Appl. No. 60/819,689, filed Jul. 10, 2006, both of which are hereby incorporated by reference herein for all purposes.

GOVERNMENT LICENSE RIGHTS

This invention was made with Government support under DAAD19-01-C-0062 awarded by the US Army Research Laboratory. The Government has certain rights in this invention.

FIELD OF THE INVENTION

The present invention relates to automated policy generation for mobile ad hoc networks. Specifically, the invention concerns a utility-driven approach aimed at generating optimal management policies with respect to given network objectives by combining optimization heuristics and network simulation to solve the problem.

BACKGROUND OF THE INVENTION

In recent years, mobile ad hoc networks have received considerable attention due to their capabilities to enable data networking without any infrastructure support. Specifically there are no wires, no dedicated routers, and no immobile network nodes. Since there are no fixed wires, nodes use wireless radios with limited capacity and high loss rates to communicate; since there are no dedicated routers, every node participates in packet forwarding, i.e. every node is a router; since the location of a node is not fixed and nodes can enter and leave the network at any time, the topology of the network is dynamic.

The use of a distributed policy-based network management tool has been demonstrated to provide the necessary self-healing and self-adapting capabilities for managing mobile ad hoc networks. See, for example, R. Chadha, Y-H Cheng, C. Chiang, S. Li, G. Levin, and A. Poylisher, "Policy-based Mobile Ad Hoc Network Management", Proc. of the 5$^{th}$ IEEE Itnl. Workshop on Policy for Distributed Systems and Networks, June 2004, R. Chadha, Y-H Cheng, C. Chiang, S. Li, G. Levin, and A. Poylisher, L. LaVergne and S. Newman, "Scalable Policy Management for Ad Hoc Networks", MIL-COM 2005, Atlantic City, N.J., Oct. 17-20, 2005, and C. Chiang et al., "Performance Analysis of DRAMA: A Distributed Policy-based System for MANET Management", MIL-COM 2006, Washington, D.C., Oct. 23-25, 2006. Although policy-based management tools contribute to network management automation, they still currently require network administrators to specify management policies. The complexity of dynamic mobile ad hoc networks makes specification of policies and effectiveness evaluation of policies extremely difficult.

SUMMARY OF THE INVENTION

The present invention provides a solution to the problem of automated generation of network management policies based on available network plans and related information. The problem of policy generation is converted into the following optimization problem: given network information and objectives as input, generate optimal policies as output. The optimization process is guided by a utility function based on performance evaluation criteria reflecting the network objectives.

While the invention concerns the design of a generic policy generation architectural framework capable of supporting policy generation for mobile ad hoc networks, it is applicable to stable, stationary networks as well. The framework can be used to generate management policies for various networking domains such as routing configuration, topology control, radio spectrum planning, and Quality of Service (QoS) assurance.

The invention provides the design of a generic architectural framework capable of generating management policies for mobile ad hoc networks, as well as for stable, stationary networks.

In an embodiment of the invention simulated annealing is applied to network simulation to automate policy generation in a network.

In another embodiment of the invention simulated annealing is applied to mathematical formulation corresponding to network simulation to automate policy generation in a network.

The invention also is used to generate policies for various management domains.

The invention will be best understood when the following description is read in conjunction with the accompanying drawings.

BRIEF DESCRIPTION OF THE DRAWINGS

FIG. 2 is parallel simulated annealing algorithm.

FIG. 3 is a graphical representation of utility values of EF classes.

DETAILED DESCRIPTION

The invention solves the problem of automated policy generation. Regardless of the type of network being considered, the solution to this problem begins with development of a model of the network and its objectives. Network and related plan information is contained in the network model and the objectives of the network are assumed to be known beforehand.

Figure 1:
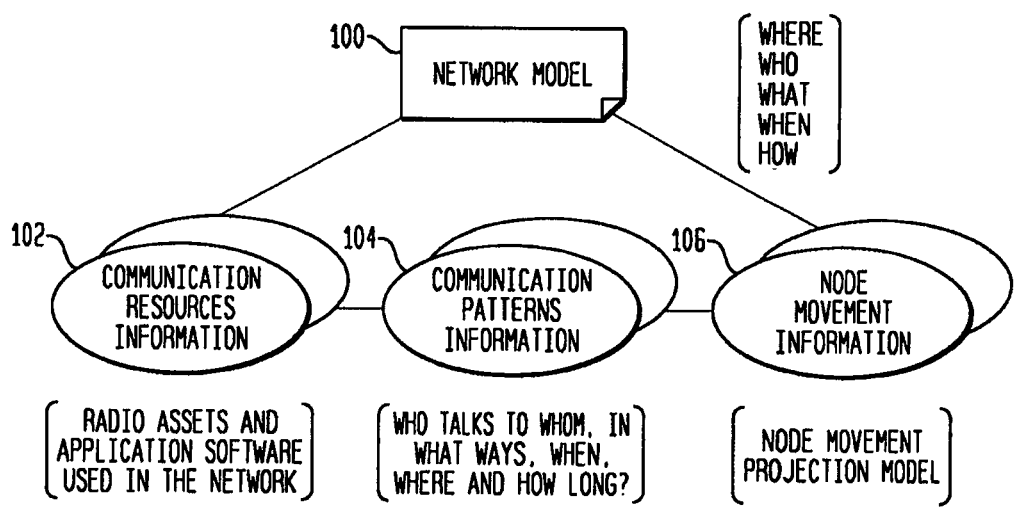
FIG. 1 is a schematic representation of a network model of mobile ad hoc networks.

The dynamicity of mobile ad hoc networks significantly increases the complexity of designing a policy composition engine. The effort starts with modeling the network. Referring now to FIG. 1, a network model 100 representing a mobile ad hoc network includes three categories of information: communication resources 102, communication patterns 104, and node movement 106. The first category contains relatively static information related to available assets. The other two categories encapsulate predictions of network usage and of the mobility model, respectively.

Network objectives are required by the policy composition engine for evaluating the effectiveness of different sets of policies for the network. Our approach is to formulate the challenge of generating policies from a network model and its objectives as an optimization problem. That is, the policy composition engine takes a network model and performance objectives (represented by a utility function) as input, and returns the policy set generating the optimal utility value as output, as described below.

A network model 100 is a data representation of the network and is denoted by NM. Network objectives are collectively represented by a single function, U, that includes a number of performance metrics such as packet loss ratio, packet transmission delay, and jitter. as its constituents. U can be a composite function to combine multiple distinct network objectives. Let Policy$_i$ denote the i$^{th}$ policy set to be evaluated. Mathematically, we want to obtain the maximum possible utility Utility$_{max}$, where Utility$_{max}$ is defined as:

$$\text{Utility}_{max} = \text{MAX}\{\text{Utility}_i\}_{i=1,2,3,} \qquad \text{eq. (1)}$$

where Utility$_i$=U(NM,Policy$_i$)

The goal, therefore, is to find a policy set, Policy$_{max}$ that optimizes the function U with a utility value Utility$_{max}$. A few concepts need to be explained regarding the above formulation. First, when NM represents a mobile ad hoc network, the dynamicity of the network must be accounted for. Second, the utility function U must closely model the network objectives. Third, to arrive at a solution, the number of policy sets to evaluate for any non-trivial network could be enormous. Lastly, we need to define the contents of a policy set Policy$_i$. Each of the concepts is described herein.

One embodiment of the invention begins with building a simulation model of the network. Any single simulation run produces one evaluation of the utility function to be optimized by the selected optimization heuristic. Referring to equation (1), NM is a mobile ad hoc network simulation model, Policy$_i$, is a specific set of policies that represents configuration settings for the network, and U is a utility function whose value can be computed based on collected simulation run statistics. Given the above setup, an optimization heuristic can be selected to drive the optimization process to determine the optimal Utility$_{max}$, i.e., the maximum value of the function U and the corresponding set of policies Policy$_{max}$.

It is implicitly assumed that there is a one-to-one mapping from a collection of configuration settings to a policy set. This assumption holds for deterministic policy models in which policy behaves deterministically rather than stochastically. This assumption also implements a language neutral policy generation paradigm. Adaptors can be built to convert configuration settings to different policy specifications.

A single simulation run for a high-fidelity network model with a reasonable number of nodes can take hundreds or even thousands of seconds to complete, and therefore the time needed for an optimization heuristic to converge to the optimal or a near-optimal solution is a major concern. The invention uses Simulated Annealing as the optimization heuristic. The implementation is based on Adaptive Simulated Annealing (ASA) described in L. Ingber, "Very Fast Simulated Re-Annealing", J. Math Computational Modeling, Vol. 12, pp. 967-973, 1989 due to its capability to reduce the number of function evaluations for the result to converge. In addition, we recognized that the structure of the simulated annealing algorithm allowed for parallelizing the search process and modified ASA to select multiple sets of parameter values and run multiple utility function evaluations in parallel. This modification allows utility values to be generated in parallel for each selected set of parameters. Once a set of parallel tasks has completed, the modified ASA again generates multiple sets of parameters for evaluation. This process repeats until the result has converged.

The optimization algorithm that uses the parallel simulated annealing algorithm is shown in FIG. 2. The goal of the algorithm is to choose values for experiment parameters (EP) that maximize the overall network utility (U) for a scenario (s) of a particular mission (M). Here a mission comprises multiple scenarios and defines the communication resources common for these scenarios, and a scenario defines communication patterns and node movements. The last parameter to the algorithm is the number of parallel evaluations (PE) at each step.

Based on the above approach, we studied the problem of automating the generation of DiffServ QoS configuration policies for mobile ad hoc networks using several different scenarios. The following case study experiment describes an embodiment of the present invention but it is not intended to limit the invention to the specific experimental values and setup. We used ns2 The Network Simulator—ns2. http://www.isi.edu/nsnan/ns as the network simulator. The experiment setup included a 50-node simulation model of a mobile ad hoc network. Each node was equipped with a single radio with 250 m communication radius. The physical data link rate of the radio was 5.5 Mbps. Nodes moved in a 2 km by 2 km square. The initial placement of nodes was random. Node movement was determined by a random waypoint mobility model. Nodes moved at a speed distributed uniformly between 0-4 m/sec. Each node communicated with a group of five other nodes during the simulation runs. Four of these nodes were randomly chosen within the communication radius and one was chosen beyond the radius at the initial node placement stage.

The network stack of the nodes in the simulation was configured as follows. All nodes used a simple TDMA-based MAC protocol. Each node was expected to receive 1/50 of the timeslots for its use. The idea was to approximate the worst-case scenario where all the nodes were in the broadcast range of each other. This assumption, though conservative, did not deviate much from the expected theoretical throughput of mobile ad hoc networks as reported in J. Li, C. Blake, D. S. J. De Couto, H. I. Lee, and R. Morris, "Capacity of Ad Hoc Wireless Networks", MobiCom, 2001. The Ad hoc On-demand Distance Vector (AODV) described in the book C. E. Perkins, Ad Hoc Networking, New York: Addison-Wesley, 2001 was used as the ad hoc routing protocol. The model implemented DiffServ with 13 DiffServ queues/classes, in addition to Best Effort (BE). Among the 13 queues nine were Expedited Forwarding (EF) queues scheduled by a priority queuing algorithm; four were Assured Forwarding (AF) queues scheduled by a weighted fair queuing (WFQ) algorithm. The WFQ scheduler was given a priority lower than that of EF9, the lowest among the EF queues. The weights assigned to AF4, AF3, AF2, and AF1 queues were 30%, 25%, 20%, and 15%, respectively. The queues were implemented as ns2 C++ objects that could be configured from Tcl. This split allowed us to easily change the configuration of queues, but still benefit from the execution speed of C++ in simulation. During the simulation initialization, each mobile node was configured to use a DiffServ queue as its packet interface queue. Each of the queues had a separate policer that shaped the traffic transiting the queue. The policer on the EF queues used a token bucket with a configurable rate and maximum size. Any incoming packet that would cause the token bucket to overflow was dropped. AF and BE queues were not policed.

QoS assurance solution for mobile ad hoc networks was included in the simulation. It included an admission control component functioning as a Bandwidth Broker and decided whether QoS requests (on a per-flow basis) should be admitted or not. This decision was based on a Measurement-Based Access Control (MBAC) approach that estimates the congestion status of the path between the sending and receiving nodes. The solution also included a quality adjustment component that preempted existing flows by downgrading them to BE as needed to adapt to dynamically changing network conditions.

The two functions of the QoS assurance solution were implemented as part of a Tcl object called platform manager. During simulation initialization, a platform manager was created to represent each node in the network. During simulation execution, these platform managers started UDP flows as specified in the scenario's communication traffic patterns description. A flow from a given AF class was three times more likely to be generated than a flow from any given EF class. EF flows belonging to different EF classes (EF3-EF9) had equal probability of being generated. EF1 and EF2 classes were used for network control (e.g., routing) and management traffic (e.g., QoS feedback messages). Therefore, the traffic patterns profile did not have any EF1 or EF2 flows. The data rate of a flow was constant in a simulation run. The flow durations were in the range of 500 and 1000 seconds, following a uniform distribution. The flow starting rate for a node was one flow every 12 seconds to create a heavily congested network scenario. The generated traffic was close to the capacity of the MAC layer. Bandwidth contention was created in this multi-hop mobile ad hoc network simulation so that QoS settings affected flow performance.

The results were obtained using a Panta Matrix System described at http://www.pantasys.com. The Panta system is a 32-processor system that used AMD Opteron 846 processors at a clock frequency of 2 GHz. The system had 64 GB memory. Eight processors were used in this study. Each simulation ran on an independent processor, but all the simulation agents shared a common file system. Red Hat Enterprise Linux 4 is the operating system.

TABLE 1

The experiment setup for DiffServ classes

| Class | AF1 | AF2 | AF3 | AF4 | | | |
|---|---|---|---|---|---|---|---|
| Index | 0 | 1 | 2 | 3 | | | |
| Stringency | 0.8 | 0.8 | 0.85 | 0.85 | | | |
| Class | EF9 | EF8 | EF7 | EF6 | EF5 | EF4 | EF3 |
| Index | 4 | 5 | 6 | 7 | 8 | 9 | 10 |
| Stringency | 0.90 | 0.90 | 0.90 | 0.90 | 0.95 | 0.95 | 0.95 |

The study focused on generating the optimal bucket sizes for the EF queues. The indices assigned to the EF and AF classes are listed in Table 1. The rows marked 'Stringency' are settings referenced by the admission control and quality adjustment components to decide at what point loss due to congestion warrants action such as flow preemption/rejection. For example, if a node sees that the admitted EF4 flows lost more than 5% (1-0.95) of their packets, it adjusts the estimate of network congestion status and possibly also downgrades some already admitted EF4 flows. In addition, any further incoming EF4 flow requests are rejected until network conditions improve. See A. Poylisher et al, supra, for more detail of the modeled QoS assurance functions.

Based on the indices in Table 1, the following utility function for the DiffServ class i was defined to measure the performance of using a set of queue bucket sizes in simulation runs:

$$U_i = (Na_i/(Na_i + Nr_i + Nd_i)) * (Ns_i/Na_i) * S_i, \qquad \text{eq. (2)}$$

Where, $Na_i$: number of alive flows at the time of observation, $Nr_i$: number of rejected flows in an observation period, $Nd_i$: number of downgraded flows in an observation period, $Ns_i$: number of satisfied flows at the time of observation, $S_i$: stringency constant of the class i.

The above utility function is chosen for the following reason. $U_i$ comprises three components. The first component, $Na_i/(Na_i + Nr_i + Nd_i)$, represents the alive flow ratio in an observation period. It is included to ensure high utility will not be attained by excessive rejection of new flow requests or by downgrading admitted flows. The second component, $Ns_i/Na_i$, measures the ratio of the satisfied flows over the alive (admitted) flows. The third component, $S_i$ considers that "satisfaction" for traffic belonging to classes with high stringency values (of higher priority classes) is harder to achieve, and therefore provides a factor that accounts for this in the utility calculation by providing a benefit. Note that with this formula the utility would be normalized in the range [0, 1].

Equation (2) represents the utility obtained by a single DiffServ class i. With the assumption that the traffic in a higher priority class should contribute more to the overall utility than that in a lower priority class, an exponential weight schedule, $W_i = 2^i$, where i is the index of a DiffServ class, is applied to the individual utilities for each class. The resulting overall utility function aggregating the utility values over all DiffServ classes, and is represented as:

$$U = \Sigma W_i * U_i$$

The above case study was performed with multiple scenarios for a number of missions. Given the use of a mobility model, the average number of hops between a sender and a receiver was found to be ~1.5. The results obtained from different scenarios shared some common traits.

The utility $U_i$ of the EF classes (EF3-EF9) is shown in FIG. 3. The duration of this particular simulation run was 2000 seconds. It took about 9 minutes for an agent to finish one simulation task. By the use of admission control and quality adjustment functions, the average utility across the EF classes was smoothed out, except for EF9, whose low priority severely affected the EF9 flows.

Figure 4:
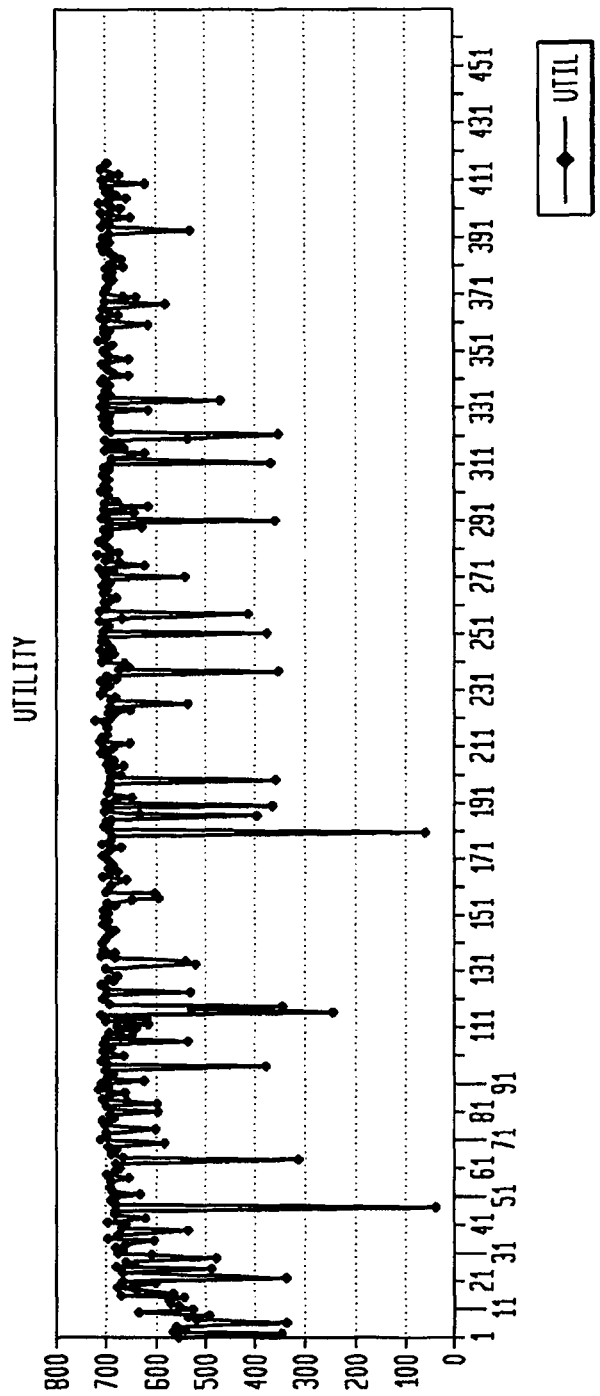
FIG. 4 is a graphical representation of the tasks in a scenario.

The overall utility as a function of task (simulation run) indices is shown in FIG. 4. After 417 simulation runs over 22 hours, the optimization engine reported a token bucket size setting with a utility of 720. However, after only 66 simulation runs (roughly 3 hours) the optimization engine had already found a configuration setting whose utility was within 97% of the reported value in the end. This result indicated that for the case study, the optimization engine could arrive at a good setting quickly. Note that even after the $66^{th}$ run, there were still some significantly worse utility values. This can be attributed to ASA's behavior. The heuristic converges very quickly, but still allows random variation to avoid the possibility of finishing with a local optimum.

In another embodiment of the invention, a mathematical model of the network is used instead of a simulation model. The mathematical model is derived directly from the simulation. Given a simulation scenario, all the information about traffic flows and node movement can be derived from the simulation trace. Therefore, at a given time instant, the network would have a static routing topology, and the information about traffic flows that may be alive at the given time instant would be available. The problem to solve is, given a static network, to find the mix of traffic flows and QoS parameters that would optimize the utility value. The following is a mathematical model for solving the above problem, which could be used to find the theoretically optimal utility value regardless of admission control decisions on traffic flows.

The procedure used to obtain a theoretically optimal utility value for a simulation scenario is as follows. From the chosen time instant, obtain routing paths between every pair of nodes. Then, run a mathematical optimization procedure to find the optimal utility value and its corresponding network configuration setting. In this study, CPLEX was used as the optimization tool, however; the invention is not limited solely to the use of a CPLEX simulation tool. The optimal utility can be used as the upper bound for validating the best utility value obtained from the corresponding simulation.

Since the above procedure focuses only on one particular instant, if multiple time instants are considered and used by the mathematical model in turn, the average utility can be used as an upper bound to gauge the credibility of the outcome of simulation runs. The following describes the mathematical model that was derived based on the above assumptions.

We are interested in determining QoS parameters that give good network performance over a period of time, under uncertainty about node positions in an ad hoc mobile network, and hence about the evolving network topology. In order to simplify the problem, we represent an instant of time under a single scenario.

The simplified problem is this: Given the following:
a network G=(V,E), representing a known topology
a total broadcast channel capacity (sometimes called bandwidth) of B
a set P of k priority classes, point-to-point demand matrices $T_i$ for each priority class i,
routings for each of the demands
a utility function U partitioning B among the priority classes so as to allow for a maximum utility subset of the point-to-point demands to be routed.

More specifically, and more formally, we proceed as follows.

Define the decision variable $X_{isd}$ to be 1 if we accept the demand for traffic of priority class i from s to d, 0 if we reject it. Let $D_i$ be the total number of point-to-point demands for priority class i, regardless of their individual capacity requirements. We take the utility function U to be linear function of X, with positive coefficients. The function $$U(X) = \sum_{i \in P} w_i \frac{\sum_{s,d \in V} X_{isd}}{D_i}$$

has been proposed for various weights $w_i$.

Define $R_{sdv}$ to be 1 if traffic from s to d is routed so as to be transmitted from node v, and 0 otherwise. Note that this almost always implies that $R_{sds}$ is 1, and $R_{sdd}$ is 0.

Define N=|V|, to simplify notation.

Being conservative, we assign a total broadcast capacity of B/N for each node.

We model the QoS parameters as a partition of B into capacity allocations $B_i$ for each priority class i, so that $$\sum_{i \in P} B_i = B.$$

We apply this same partition to the transmission capacity of each node, so the resulting capacity given to priority class i at node v is $B_i/N$ for all nodes v in V.

The value of such a partition, value $(B_1, \ldots, B_k)$ is defined to be the solution to following optimization problem (an integer program):
maximize U(X) over $X \in \{0,1\}^{P \times V \times V}$ subject to $$\sum_{s,d \in V} T_{isd} R_{sdv} X_{isd} \leq B_i / N$$

$$\forall v \in V, i \in P$$

The overall problem is: maximize value $(B_1, \ldots, B_k)$ subject to $$\sum_{i \in P} B_i = B$$

$$B_i \geq 0$$

$$\forall i \in P.$$

There might be some value, lower than 100%, at which we obtain some utility.

In some cases we obtain most of the utility at 90% of the requested amount, with some gain as we approach 100%. This can be modeled by adding more problem parameters, and more variables. Let $A_i$ be the fraction of the requested value at which we first achieve utility (90% in our example), $C_i$ the utility achieved at this point, and $D_i$ the rate at which utility increases from this point, for priority class i. To the binary variables $X_{isd}$ now representing the decision to serve at least $A_i$ of the request, we now add continuous variables $Y_{isd}$, representing the amount served above $A_i$ of the request. The utility function becomes:

$$U(X) = \sum_{i \in P} w_i \frac{\sum_{s,d \in V} C_i X_{isd} + D_i Y_{isd}}{D_i}$$

The sub-problem defining the value of a capacity partition becomes:
maximize U(X) over $X \in \{0,1\}^{P \times V \times V}$, $Y \in R_+^{P \times V \times V}$ subject to:

$$\sum_{s,d \in V} T_{isd} R_{sdv} (A_i X_{isd} + Y_{isd}) \leq B_i / N$$

$$\forall v \in V, i \in P$$

$$0 \leq Y_{isd} \leq (1 - A_i) X_{isd}$$

$$\forall s, d \in V, i \in P$$

This standard technique can be extended to arbitrary piecewise-linear utility functions, adding a new binary variable and a new continuous variable for each piece. New constraints would also be added to ensure that the variables properly represent the fact that we are in only one piece at a time for any given source-destination and priority class.

The invention is an architecture of an automated policy generation system. The system is designed to take network model and objectives as input and generate network configuration parameters as output. The approach has been implemented and a case study on a sample DiffServ QoS problem was performed. Near-optimal DiffServ token bucket sizes were generated as output. Automatic generation of management policies for mobile ad hoc networks is essential.

While there has been described and illustrated a method and system for automated policy generation for mobile ad hoc networks, it will be apparent to those skilled in the art that modifications and variations are possible without deviating from the spirit and broad teachings of the invention which shall be limited solely by the scope of the claims appended hereto.

The invention claimed is:

1. A method comprising:
building a simulation of a mobile ad hoc network comprising:
a plurality of nodes having packet interface queues, at least one node of the plurality of nodes utilizing a priority queue as its packet interface queue and having a policer; and
the policer using a token bucket configured to drop any incoming packets that would cause the token bucket to overflow; and
maximizing, using a computing device, a utility function of the simulation of the mobile ad hoc network configured to generate an optimal bucket size for the token bucket and using as input: an alive flow ratio in an observation period, a ratio of satisfied flows over alive flows, and a stringency constant.

2. The method of claim 1 wherein the utility function comprises $U_i$; wherein $$U_i = \left(\frac{Na_i}{(Na_i + Nr_i + Nd_i)}\right) * \left(\frac{Ns_i}{Na_i}\right) * S_i;$$

wherein $Na_i$, comprises a number of alive flows at a time of observation; $Nr_i$ comprises a number of rejected flows in an observation period; $Nd_i$ comprises a number of downgraded flows in the observation period; $Ns_i$ comprises a number of satisfied flows at the time of observation; and $S_i$ comprises a stringency constant of the class i.

3. The method of claim 2 wherein an overall utility function for all classes comprises U; wherein $U = \Sigma W_i * U_i$; and
wherein $W_i$ comprises a weight schedule.

4. The method of claim 3 wherein $W_i$ comprises an exponential weight schedule.

5. The method of claim 1 wherein building the simulation of the mobile ad hoc network comprises compiling information regarding communication resources, communication patterns, and node movement for the mobile ad hoc network.

6. The method of claim 1 wherein the package interface queues comprise Expedited Forwarding queues scheduled by a priority queuing algorithm.

7. The method of claim 6 wherein the package interface queues further comprise Assured Forwarding queues scheduled by a weighted fair queuing algorithm.

8. The method of claim 1 wherein the simulation further comprises a quality of service assurance solution comprising an admission control component and a quality adjustment component.

9. A non-transitory computer readable medium having instructions stored thereon, the instructions configured to cause a computing device to perform operations comprising:
building a simulation of a mobile ad hoc network comprising:
a plurality of nodes having packet interface queues, at least one node of the plurality of nodes utilizing a priority queue as its packet interface queue and having a policer; and
the policer using a token bucket configured to drop any incoming packets that would cause the token bucket to overflow; and
maximizing a utility function of the simulation of the mobile ad hoc network configured to generate an optimal bucket size for the token bucket and using as input: an alive flow ratio in an observation period, a ratio of satisfied flows over alive flows, and a stringency constant.

10. The non-transitory computer readable medium of claim 9 wherein the utility function comprises $U_i$;
wherein $$U_i = \left(\frac{Na_i}{(Na_i + Nr_i + Nd_i)}\right) * \left(\frac{Ns_i}{Na_i}\right) * S_i;$$

and
wherein $Na_i$ comprises a number of alive flows at a time of observation; $Nr_i$ comprises a number of rejected flows in an observation period; $Nd_i$ comprises a number of downgraded flows in the observation period; $Ns_i$ comprises a number of satisfied flows at the time of observation; and $S_i$ comprises a stringency constant of the class i.

11. The non-transitory computer readable medium of claim 10 wherein an overall utility function for all classes comprises U;
wherein $U = \Sigma W_i * U_i$; and
wherein $W_i$ comprises a weight schedule.

12. The non-transitory computer readable medium of claim 11 wherein $W_i$ comprises an exponential weight schedule.

13. The non-transitory computer readable medium of claim 9 wherein building the simulation of the mobile ad hoc network comprises compiling information regarding communication resources, communication patterns, and node movement for the mobile ad hoc network.

14. The non-transitory computer readable medium of claim 9 wherein the package interface queues comprise expedited forwarding queues scheduled by a priority queuing algorithm.

15. The non-transitory computer readable medium of claim 14 wherein the package interface queues further comprise assured forwarding queues scheduled by a weighted fair queuing algorithm.

16. The non-transitory computer readable medium of claim 9 wherein the simulation further comprises a quality of service assurance solution comprising an admission control component and a quality adjustment component.

17. A simulation generator apparatus for mobile ad hoc networks, the simulation generator apparatus comprising:
a computing device configured to access a simulation of a mobile ad hoc network comprising:
a plurality of nodes having packet interface queues, at least one node of the plurality of nodes utilizing a priority queue as its packet interface queue and having a policer; and
the policer using a token bucket configured to drop any incoming packets that would cause the token bucket to overflow; and
an optimization engine in communication with the computing device, the optimization engine configured to maximize a utility function of the simulation of the mobile ad hoc network configured to generate an optimal bucket size for the token bucket and using as input: an alive flow ratio in an observation period, a ratio of satisfied flows over alive flows, and a stringency constant.

18. The simulation generator apparatus of claim 17 wherein the utility function comprises $U_i$; wherein $$U_i = \left(\frac{Na_i}{(Na_i + Nr_i + Nd_i)}\right) * \left(\frac{Ns_i}{Na_i}\right) * S_i;$$

and wherein $Na_i$ comprises a number of alive flows at a time of observation; $Nr_i$ comprises a number of rejected flows in an observation period; $Nd_i$ comprises a number of downgraded flows in the observation period; $Ns_i$ comprises a number of satisfied flows at the time of observation; and $S_i$ comprises a stringency constant of the class i.

19. The simulation generator apparatus of claim 18 wherein an overall utility function for all classes comprises U; wherein $U=\Sigma W_i * U_i$; and wherein $W_i$ comprises a weight schedule.

20. The simulation generator apparatus of claim 19 wherein $W_i$ comprises an exponential weight schedule.

21. The simulation generator apparatus of claim 17 wherein the computing device configured to receive the simulation comprises the computing device configured to received information regarding communication resources, communication patterns, and node movement for the mobile ad hoc network.

22. The simulation generator apparatus of claim 17 wherein the package interface queues comprise expedited forwarding queues scheduled by a priority queuing algorithm.

23. The simulation generator apparatus of claim 22 wherein the package interface queues further comprise assured forwarding queues scheduled by a weighted fair queuing algorithm.

24. The simulation generator apparatus of claim 17 wherein the simulation further comprises a quality of service assurance solution comprising an admission control component and a quality adjustment component.

25. A method comprising:
obtaining routing topology and channel capacity for a given time instant for a communication network;
determining, using a computing device, an optimal utility value for the communication network with a mathematical utility function using information from the routing topology and the channel capacity as input to partition the channel capacity among a set of priority classes to route a maximum utility subset of point-to-point demand matrices for each priority class; and
determining, using a computing device, one or more quality of service parameters for the communication network corresponding to the optimal utility value.

26. The method of claim 25 wherein the mathematical utility function comprises U(X); wherein $$U(X) = \sum_{i \in P} w_i \frac{\sum_{s,d \in V} X_{isd}}{D_i};$$

and wherein $w_i$ comprises a weight factor, $X_{isd}$ comprises a binary variable configured to accept or reject demands for traffic of priority class i; and $D_i$ comprises the total number of point-to-point demands for the priority class i.

27. The method of claim 25 wherein the mathematical utility function comprises U(X); wherein $$U(X) = \sum_{i \in P} w_i \frac{\sum_{s,d \in V} C_i X_{isd} + D_i Y_{isd}}{D_i};$$

and wherein $w_i$ comprises a weight factor, $A_i$ comprises a fraction of requested value at which utility is obtained; $C_i$ comprises the current utility achieved; $D_i$ comprises the current rate at which utility increases for priority class i; $X_{isd}$ comprises a binary variable configured to accept or reject at least $A_i$ of the requested value; and $Y_{isd}$ comprises the amount served above $A_i$.

28. The method of claim 25 wherein determining the one or more quality of service parameters further comprises determining one or more quality of service parameters modeled as a partition of the channel capacity into capacity allocations for each priority class i.

29. The method of claim 25 wherein the obtaining routing topology and the channel capacity for the given time instant for the communication network comprises obtaining routing topology and channel capacity for a plurality of time instants for the communication network; and
the determining the optimal utility value for the communication network with the mathematical utility function comprises determining an optimal value for the communication network for each of the plurality of time instants with the mathematical utility function.

30. The method of claim 25 further comprising determining a credibility of a simulation of the communication network with the optimal utility value.

31. A non-transitory computer readable medium having instructions stored thereon, the instructions configured to cause a computing device to perform operations comprising:
obtaining routing topology and channel capacity for a given time instant for a communication network;
determining an optimal utility value for the communication network with a mathematical utility function using the routing topology and the channel capacity as input to partition the channel capacity among a set of priority classes to route a maximum utility subset of point-to-point demand matrices for each priority class; and
determining one or more quality of service parameters for the communication network corresponding to the optimal utility value.

32. The non-transitory computer readable medium of claim 31 wherein the mathematical utility function comprises U(X); wherein $$U(X) = \sum_{i \in P} w_i \frac{\sum_{s,d \in V} X_{isd}}{D_i};$$

and wherein $w_i$ comprises a weight factor, $X_{isd}$ comprises a binary variable configured to accept or reject demands for traffic of priority class i; and $D_i$ comprises the total number of point-to-point demands for the priority class i.

33. The non-transitory computer readable medium of claim 31 wherein the mathematical utility function comprises U(X); wherein $$U(X) = \sum_{i \in P} w_i \frac{\sum_{s,d \in V} C_i X_{isd} + D_i Y_{isd}}{D_i};$$

and wherein $w_i$ comprises a weight factor, $A_i$ comprises a fraction of requested value at which utility is obtained; $C_i$ comprises the current utility achieved; $D_i$ comprises the current rate at which utility increases for priority class i; $X_{isd}$ comprises a binary variable configured to accept or reject at least $A_i$ of the requested value; and $Y_{isd}$ comprises the amount served above $A_i$.

34. The non-transitory computer readable medium of claim 31 wherein determining the one or more quality of service parameters further comprises determining one or more quality of service parameters modeled as a partition of channel capacity into capacity allocations for each priority class i.

35. The non-transitory computer readable medium of claim 31 wherein the obtaining routing topology and the channel capacity for the given time instant for the communication network comprises obtaining routing topology and channel capacity for a plurality of time instants for the communication network; and the determining the optimal utility value for the communication network with the mathematical utility function comprises determining an optimal value for the communication network for each of the plurality of time instants with the mathematical utility function.

36. The non-transitory computer readable medium of claim 31 wherein the operations further comprise determining a credibility of a simulation of the communication network with the optimal utility value.

37. A network configuration generator apparatus for networks; the network configuration generator apparatus comprising:

a computing device configured to access routing topology and channel capacity for a given time instant for a communication network;

a network optimization engine in communication with the computing device and configured to:

determine an optimal utility value for the communication network with a mathematical utility function using the routing topology and the channel capacity as input to partition the channel capacity among a set of priority classes to route a maximum utility subset of point-to-point demand matrices for each priority class; and determine one or more quality of service parameters for the communication network corresponding to the optimal utility value.

38. The network configuration generator apparatus of claim 37 wherein the mathematical utility function comprises U(X); wherein $$U(X) = \sum_{i \in P} w_i \frac{\sum_{s,d \in V} X_{isd}}{D_i};$$

and wherein $w_i$ comprises a weight factor, $X_{isd}$ comprises a binary variable configured to accept or reject demands for traffic of priority class i; and $D_i$ comprises the total number of point-to-point demands for the priority class i.

39. The network configuration generator apparatus of claim 37 wherein the mathematical utility function comprises U(X); wherein $$U(X) = \sum_{i \in P} w_i \frac{\sum_{s,d \in V} C_i X_{isd} + D_i Y_{isd}}{D_i};$$

and wherein $w_i$ comprises a weight factor, $A_i$ comprises a fraction of requested value at which utility is obtained; $C_i$ comprises the current utility achieved; $D_i$ comprises the current rate at which utility increases for priority class i; $X_{isd}$ comprises a binary variable configured to accept or reject at least $A_i$ of the requested value; and $Y_{isd}$ comprises the amount served above $A_i$.

40. The network configuration generator apparatus of claim 37 wherein the network optimization engine configured to determine the one or more quality of service parameters further comprises the network optimization engine configured to determine one or more quality of service parameters modeled as a partition of the channel capacity into capacity allocations for each priority class i.

41. The network configuration generator apparatus of claim 37 wherein the network optimization engine configured to obtain the routing topology and the channel capacity for the given time instant for the communication network comprises the network optimization engine configured to obtain routing topology and channel capacity for a plurality of time instants for the communication network; and the network optimization engine configured to determine the optimal utility value for the communication network with the mathematical utility function comprises the network optimization engine configured to determine an optimal value for the communication network for each of the plurality of time instants with the mathematical utility function.

42. The network configuration generator apparatus of claim 37 wherein the computing device is further configured to determine a credibility of a simulation of the communication network with the optimal utility value.

* * * * *